(12) United States Patent
Gray et al.

(10) Patent No.: US 7,806,355 B2
(45) Date of Patent: Oct. 5, 2010

(54) FISHING REEL (75) Inventors: Brandon P. Gray, Macon, MO (US); Jeffrey E. Crawford, LaPlata, MO (US)

(73) Assignee: Ardent Outdoors, Inc., St. Louis, MO (US)

( * ) Notice: Subject to any disclaimer, the term of this patent is extended or adjusted under 35 U.S.C. 154(b) by 77 days.

(21) Appl. No.: 12/012,284

(22) Filed: Feb. 1, 2008

(65) Prior Publication Data
US 2009/0194626 A1 Aug. 6, 2009

(51) Int. Cl.
*A01K 89/01* (2006.01)
(52) U.S. Cl. .................. 242/245; 242/295; 242/310
(58) Field of Classification Search .............. 242/245, 242/257, 271, 309, 310, 295
See application file for complete search history.

(56) References Cited

U.S. PATENT DOCUMENTS

| | | | | |
|---|---|---|---|---|
| 569,128 A * | 10/1896 | Guild | .................. | 242/396.4 |
| 599,138 A * | 2/1898 | Boyle | .................. | 242/251 |
| 889,974 A * | 6/1908 | Schreidt | .................. | 242/255 |
| 1,654,667 A * | 1/1928 | Russell | .................. | 242/310 |
| 3,784,124 A * | 1/1974 | Shumate et al. | .................. | 242/297 |
| 4,509,705 A * | 4/1985 | Councilman et al. | .................. | 242/245 |
| 5,829,701 A * | 11/1998 | Murayama et al. | .................. | 242/310 |
| 5,833,155 A * | 11/1998 | Murayama | .................. | 242/279 |
| 6,016,982 A * | 1/2000 | Asano et al. | .................. | 242/310 |
| 6,189,822 B1 * | 2/2001 | Ikuta | .................. | 242/296 |
| 6,889,926 B1 * | 5/2005 | Li | .................. | 242/311 |
| D583,010 S * | 12/2008 | Gray | .................. | D22/140 |
| 2003/0146323 A1 | 8/2003 | Jeane | | |

* cited by examiner

Primary Examiner—Emmanuel M Marcelo
(74) Attorney, Agent, or Firm—Polster Lieder Woodruff & Lucchesi (57) ABSTRACT

The present invention relates generally to the field of fishing reels, and in particular, one type of reel described herein is a "bait cast" reel, specifically one designed for the particular styles of fishing commonly referred to as "flippin' and pitchin'", wherein several improvements over the art are disclosed, including a highly durable and smooth line retainer element on the spool, a line retainer element, and a drag lock system that can be either adjustable or permanent.

16 Claims, 6 Drawing Sheets

FISHING REEL

FIELD OF THE INVENTION

The present invention relates generally to the field of fishing reels, and in particular, one type of reel described herein is a "bait cast" reel, specifically one designed for the particular styles of fishing commonly referred to as "flippin' and pitchin'".

BACKGROUND OF THE INVENTION

Bait cast fishing reels typically include a handle rotatably attached to a crankshaft on the exterior of a reel frame, and a gear mechanism by which the handle, by way of the crankshaft, engages a spool that is rotatably attached to the interior of the frame, such that rotations of the handle result in rotations of the spool. Through the gear mechanism, when present, the handle and the spool most typically revolve in opposite directions and in parallel axes. Some bait cast reels do not include a gear mechanism, though this is a generally undesirable configuration for a number of reasons known in the art.

A gear mechanism may, through the use of varying sizes of a gear and a pinion, or a plurality of gears, pinions or both, enable the spool to wind at a rate different from the wind rate of the handle. Typically, the rate of rotation of the spool is greater than the rate of rotation of the handle, as this permits more fishing line to be retrieved onto the spool by the angler with less manual winding of the handle than would otherwise be needed without the gear mechanism. This relationship between the rotation rate of the handle and the rotation rate of the spool is typically expressed as a ratio, commonly referred to as a "gear ratio" or a "wind ratio".

A bait cast reel is distinguishable from another common type of reel known as a spinning reel, where the handle and the spool, through a different gear mechanism, revolve around axes perpendicular to one another. Other differences exist between the two types of reels, though this particular distinction is generally considered by those skilled in the art to be the most significant.

On a bait cast reel, the spool may be allowed to rotate freely during casting, wherein line is unwound from the spool, by the engaging of a clutch to release some portion of the gear mechanism from the spool by the angler. Bait cast fishing reels may contain a system called a "level wind" that evenly distributes the line onto the spool, through the use of a moving guide hole, where the guide hole's movements guide the line being retrieved by the angler back onto the spool in an even manner across the width of the spool.

On a bait cast reel, typically a drag system is in place. A drag system is a mechanism that permits the slow unwinding of the line from the spool, through the rotation of the spool, in response to tension on the fishing line when the spool is engaged with the gear mechanism. This prevents the tension on the line, preferably from a fish, from breaking the fishing line, which would undesirably result in the loss of the fish, the lure or bait, and fishing line. Bait cast fishing reels may also have a system for adjustment of the drag on the line during retrieval of a fish, such that the amount of tension on the line required to unwind the line from the spool can be changed by the angler. Controlling the drag enables the user to let out line in response to the motion of the fish, and for different lures or baits and/or different fishing conditions.

Flipping and pitching are two techniques that may be employed while fishing with a bait cast reel, where the reel has been loaded with fishing line and appropriately affixed to a fishing pole (also referred to as a "rod"), and a lure or bait has been secured to the free end of the fishing line. The flipping method (also referred to as "Flippin'") is used when accurate placement of the lure or bait in the water is desired, usually to a visible location, often surrounded by thick cover at a relatively short distance away from the angler. Flipping involves letting out a length of fishing line approximately double the length of the rod and holding the extra fishing line in the free hand. The rod is then raised and the lure or bait swings back toward the angler. Lowering the rod swings the lure or bait away and the angler lets go of the fishing line as the lure or bait swings toward the target. The lure or bait then softly touches down in the desired location. The pitching method (also referred to as "Pitchin'") is another technique that allows the lure or bait to quietly touch down at targets a relatively short distance away. In pitching the lure or bait, the angler releases the lure or bait to the length of the reel, and then lowers the rod to put tension on the fishing line. The tip of the rod is then swung forward toward the target with the angler's free hand releasing the lure or bait and the fishing line is released from the reel, thereby pitching the lure or bait to the desired location.

Both the pitching and flipping techniques are intended to be used in locations in the water where there is heavy cover, or submerged obstacles, such as branches, trees, or logs. In heavy cover, allowing the fish to run once taking the lure or bait frequently results in line snag, breakage, or failed recovery. Avoiding this result requires setting the hook and retrieving the fish quickly. Bait casting reels with level winds and drag systems must be adjusted precisely to enable the angler to achieve a quick and successful retrieval of the fish. Most novice anglers find achieving such control difficult. Additionally, quickly setting the hook and quick withdrawal may place large loads of force on the fishing line. Larger loads require heavier fishing line and may in turn increase the wear on bait cast reel components.

Previous enhancements in the developments of fishing reels have attempted to address the issues of complicated drag control and make a simpler reel for the novice angler who wishes to use the flipping or pitching method. One modification involved the removal of the level wind mechanism and utilized a centrally located, fixed line guide feeding the line onto a narrower spool. However, even with this modification, performance problems persisted, as the fishing line had tendencies to slip around the spool, and less fishing line could be wound onto the spool. Additionally, the issues of drag control and additional wear on the reel remain problems in the art that have not yet been successfully resolved.

SUMMARY OF THE INVENTION

The present invention comprises a bait cast reel with significant and useful improvements over the state of the art. Several enhancements are disclosed herein that overcome problems recognized in the art of fishing reels, particularly bait cast reels, more particularly when a bait cast reel is used in conjunction with flipping and pitching methods.

One problem encountered in the art is associated with the use of high strength fishing line, which may comprise a high test monofilament fishing line or a high test braided fishing line. The "test" of a fishing line refers to the strength of the line, by indicating the approximate amount of weight the line can withstand without breaking. A monofilament line of a given test weight is typically much thicker than a braided fishing line of the same test weight. Due to the expense of braided fishing lines, among other reasons, anglers may prefer monofilament line. Monofilament line of such thickness as well as braided line can both be difficult to secure to the spool, and, once secured to the spool, may be difficult to secure in place on the spool so that it may be wound onto the spool when the spool rotates. Flipping and pitching methods tend to involve the use of rather high test fishing line, and thus the aforementioned problems associated with high test fishing line are relevant to the present invention. The present invention overcomes this obstacle in the art through the addition of a line retainer element on the spool.

Another problem encountered in the art is associated with the high tension placed on the fishing line when the angler is using the flipping and pitching methods. When flipping and pitching, it is desirable to set the hook in the fish's mouth as quickly as possible and prevent the fish from running, which could potentially tangle or wrap the fishing line around some object or other snag. The flipping and pitching method requires the angler to supply significant force on the fishing line, and in turn on the point at which the fishing line exits the spool, which is known as the line hole. The aforementioned force can have adverse consequences on the line, and thus a durable, smoothed surface of the line hole is preferred. Additionally, when the line hole is not made of a durable, smoothed surface, over time the aforementioned force can result in deformation of the line hole, which can cause performance issues or damage to the line. The present invention overcomes this obstacle in the art through the addition of a durable, smoothed line hole, as well as other improvements to the line hole that are disclosed herein.

Yet another problem encountered in the art is also relative to the flipping and pitching methods. As previously explained herein, it is typical for fishing reels in general, including bait cast reels, to include a drag system. However, given the environment in which flipping and pitching are practiced, it can be highly undesirable to have a drag in operation on the reel. For example, when casting into heavy cover, or around submerged obstacles, such as branches, trees, or logs, if the fish was to take the lure or bait and attempt to run, the spool while still engaged to the gear mechanism would normally unwind through the drag system. This can result in the line being tangled around the cover or obstacles. If a heavy line has been used and the tangle cannot be undone, it will need to be cut, resulting in the loss of the fish, the bait or lure, and line. If a weak line has been used, then most likely the tangling, in combination with the fighting by the fish, will result in the breakage of the line, which in turn results in the loss of the fish, the bait or lure, and line. Drag systems on bait cast reels can usually be adjusted, but doing so can be cumbersome and not completely effective. The present invention overcomes this obstacle in the art through the addition of a drag lock system, including either an adjustable or permanent drag lock system.

The present invention includes other new and useful improvements over the state of the art that will become apparent to those of ordinary skill in the art from the disclosure herein.

DETAILED DESCRIPTION OF THE INVENTION

The present invention provides a reel for bait cast fishing but with several improvements and modifications particularly adapted to the pitching and flipping methods.

The bait cast fishing reel of the present invention comprises a frame 25, a spool 61, and a handle 59. The frame 25 further comprises a brake housing. The spool 61 is rotatably attached to and contained within the frame 25. The handle 59 is rotatably attached to the crankshaft assembly 19 on the exterior of the frame 63. The handle 59 and the spool 61 inversely rotate in parallel via a gear mechanism. The gear mechanism is contained within the portion of the frame 25 on the same side as the handle 59. A brake housing is contained on the portion of the frame 25 opposite the handle 59.

The frame 25 of the bait cast fishing reel of the present invention further comprises a front cover 73. The front cover 73 comprises a line hole 67, and the front cover 73 does not include a level wind mechanism.

The spool 61 of the bait cast fishing reel of the present invention comprises a recessed portion 69 and two full portions 71. The recessed portion 69 of the spool resides between the two full portions 71 of the spool, and is defined by a diameter smaller than that of the two full portions. The two full portions 71 of the spool are preferably substantially identical in width and diameter. The recessed portion 69 of the spool is preferably of substantially the same width as the diameter of the line hole 67, and the recessed portion 69 of the spool is preferably in substantial alignment with the line hole 67.

The spool 61 of the bait cast fishing reel of the present invention further comprises a line retainer element 65. The line retainer element 65 resides on the recessed portion 69 of the spool and is preferably located substantially in the center of the recessed portion of the spool, though it may be anywhere within the recessed portion of the spool. The line retainer element 69 may be a peg or notch or any other suitable shape, but is preferably a mushroom-type peg. A mushroom-type peg is defined as a cylinder and a hemisphere, where the cylinder has a height less than its diameter, and the hemisphere has a diameter larger than the diameter of the cylinder, and where the plane surface of the hemisphere resides on one of the plane surfaces of the cylinder, such that the center of the plane of the hemisphere is in substantial alignment with the center of the plane of the cylinder on which it resides, and where the other plane surface of the cylinder is affixed to the surface of the recessed portion 69 of the spool. Preferably, the line retainer element 65 is approximately one quarter to one half in its greatest diameter of the width of the deepest portion of the recessed portion 69 of the spool.

The bait cast fishing reel of the present invention also comprises a line hole 67 that consists essentially of a durable material with a smooth surface where the line can rub on the hole as the line moves through the hole in either direction. The durable, smoothed material is preferably a substantially corrosion-resistant material. A preferred durable, smoothed material is stainless steel. Another preferred durable, smoothed material is a ceramic. In an embodiment of the present invention, the durable, smoothed material is coated with a durable, smoothed coating. A preferred durable, smoothed coating is Chromium Nitride. Another preferred durable, smoothed coating is Titanium Nitride.

In an embodiment of the present invention, the gear ratio of the bait cast reel is between about 1:1 to about 7:1, where the gear ratio represents the number of turns of the spool 61 to the number of turns of the handle 59. In a preferred embodiment of the present invention, the gear ratio of the bait cast reel is between about 5:1 to about 7:1. In a particularly preferred embodiment, the gear ratio is 6:1.

The present invention includes a drag lock system, which may be either an adjustable drag lock or a permanent drag lock. The drag lock system of the present invention is not restricted to bait cast reels, though that is the preferred use of the drag lock system. As described herein, certain changes could be made by those of ordinary skill in the art to adapt the drag lock system of the described bait cast reel embodiments for use in a spinning reel. Such an adaptation is expressly and intended to be within the scope and bounds of the equivalents of the present invention.

Additionally, as different manufacturers of bait cast reels may have components within their reels that vary from each other and from those shown and described in the illustrative embodiments herein, certain changes could be made by those of ordinary skill in the art to adapt the drag lock system of the described bait cast reel embodiments for use in a bait cast reel made by another manufacturer. Such an adaptation is expressly and intended to be within the scope and bounds of the equivalents of the present invention.

In essence, the drag lock system of the present invention comprises a pin that, when inserted into the gear, bypasses the drag, and prevents the unwinding of the spool 61. This pin may adjustably or permanently bypass the drag on a fishing reel, non-limiting examples of which can be seen in the embodiments further detailed herein and in the figures.

In a preferred embodiment of the present invention, a reel with an adjustable drag lock system will also comprise a traditional drag system, such that the angler can adjust the level of drag through conventional means, such as through the drag control knob 75, as well as toggle the adjustable drag lock system on and off. Such an embodiment is visible on a bait cast reel generally in FIGS. 1 through 5.

Referring generally to FIGS. 1 through 5, the present invention includes a bait cast reel with an adjustable drag lock system.

Referring generally to FIGS. 6 through 10, the present invention includes a bait cast reel with a permanent drag lock system.

Figure 1:
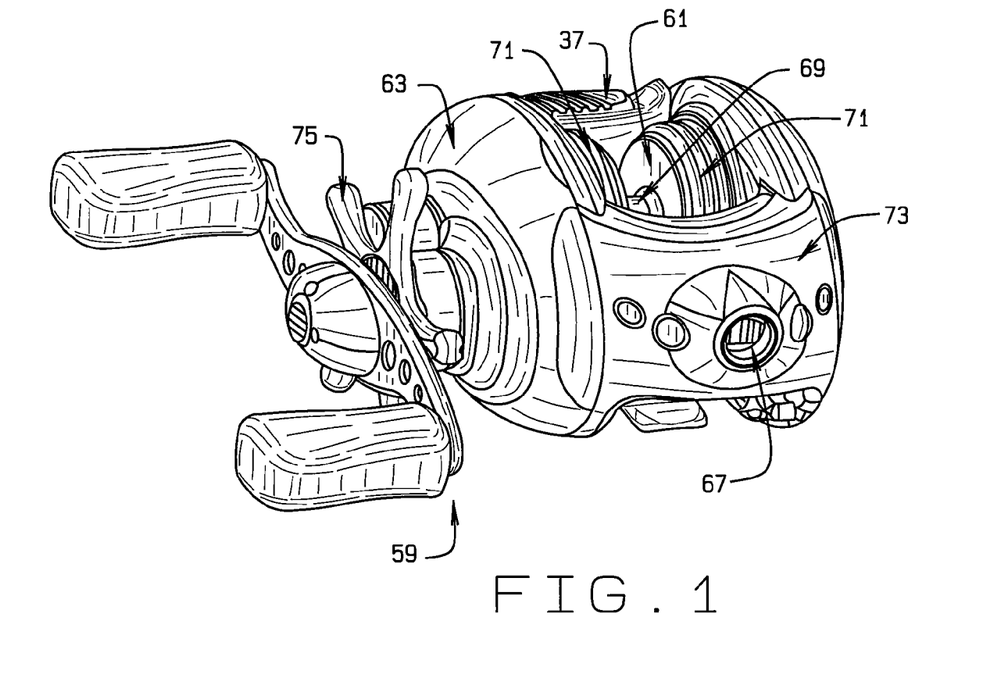
FIG. 1 is a perspective view of an embodiment of the present invention, this particular embodiment comprising an adjustable drag lock system.
Figure 2:
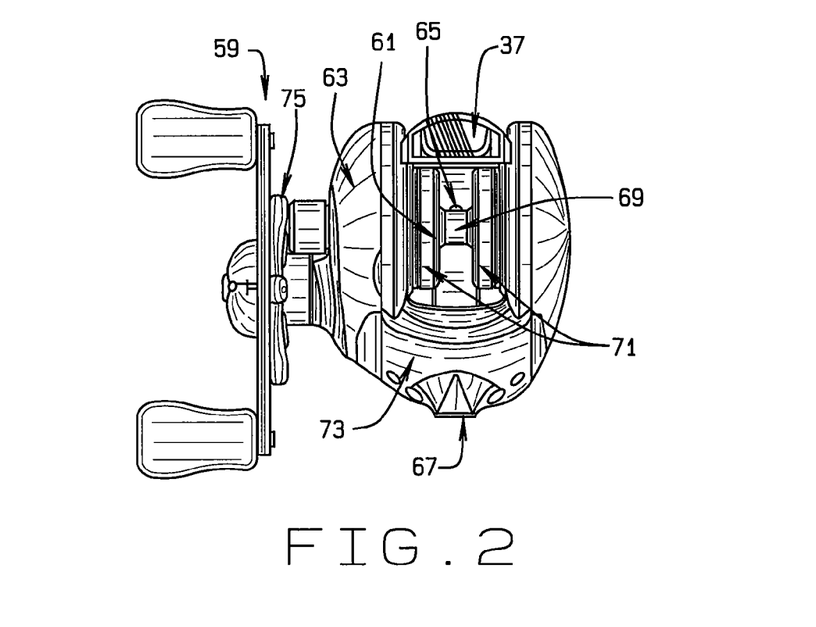
FIG. 2 is a top view of an embodiment of the present invention, this particular embodiment comprising an adjustable drag lock system.
Figure 3:
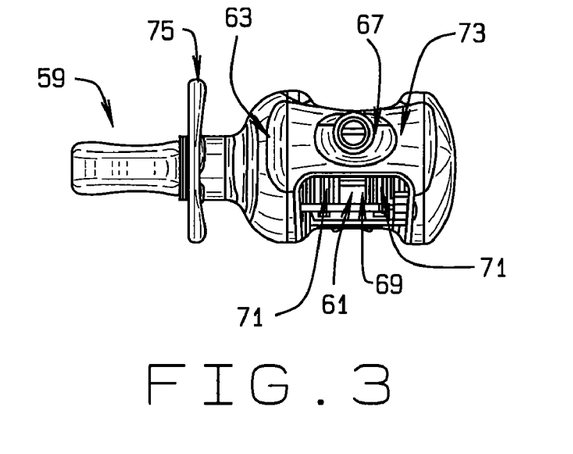
FIG. 3 is a front view of an embodiment of the present invention, this particular embodiment comprising an adjustable drag lock system.
Figure 4:
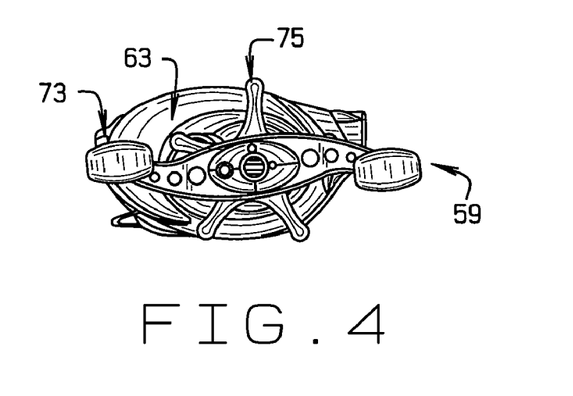
FIG. 4 is a side view of an embodiment of the present invention, this particular embodiment comprising an adjustable drag lock system.
Figure 5:
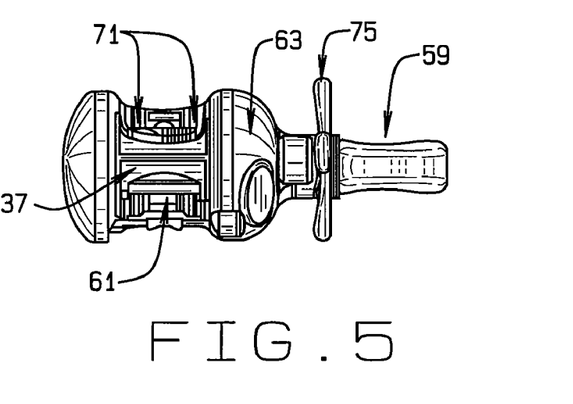
FIG. 5 is a rear view of an embodiment of the present invention, this particular embodiment comprising an adjustable drag lock system.
Figure 6:
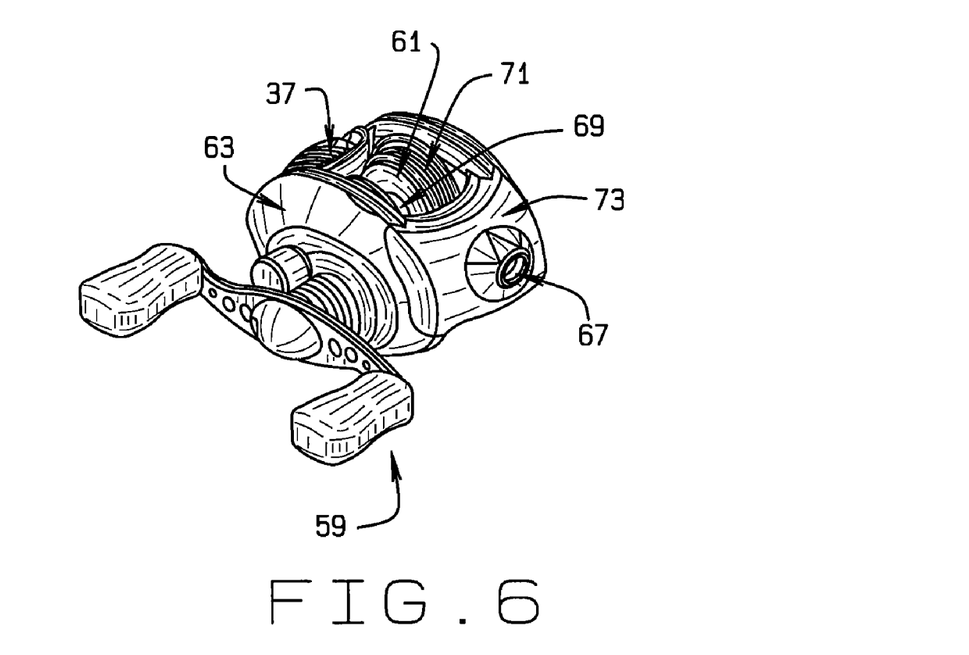
FIG. 6 is a perspective view of an embodiment of the present invention, this particular embodiment comprising a permanent drag lock system.
Figure 7:
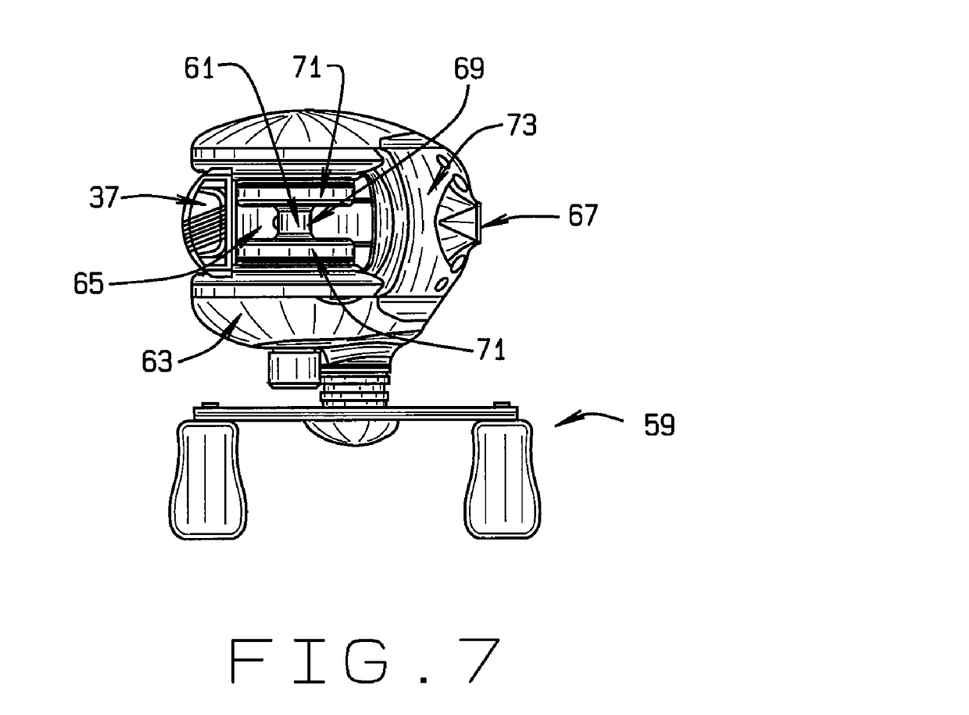
FIG. 7 is a top view of an embodiment of the present invention, this particular embodiment comprising a permanent drag lock system.
Figure 8:
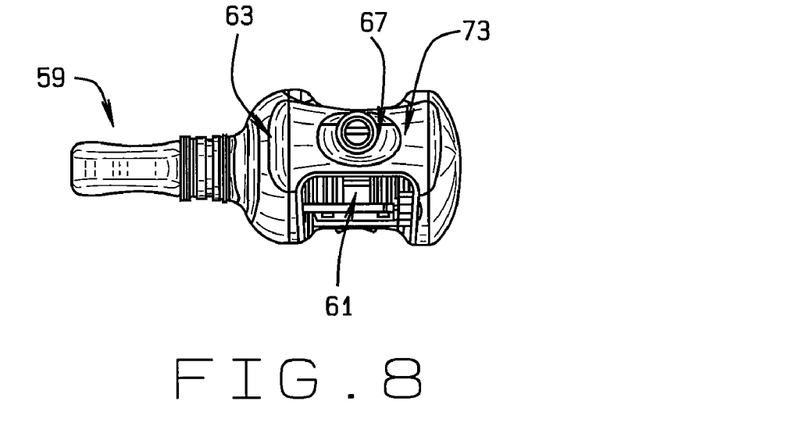
FIG. 8 is a front view of an embodiment of the present invention, this particular embodiment comprising a permanent drag lock system.
Figure 9:
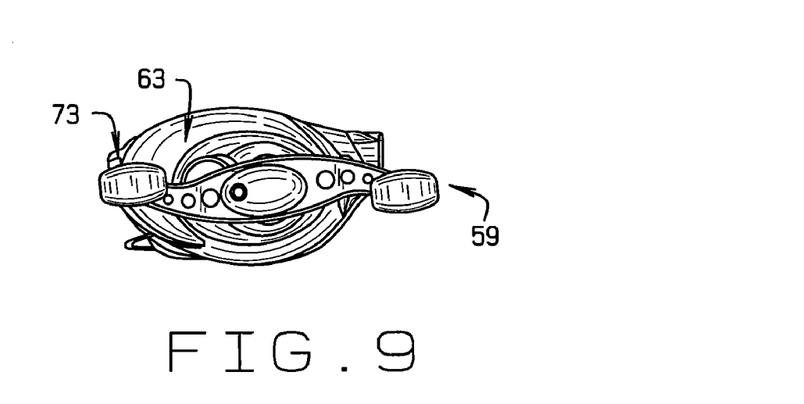
FIG. 9 is a side view of an embodiment of the present invention, this particular embodiment comprising a permanent drag lock system.
Figure 10:
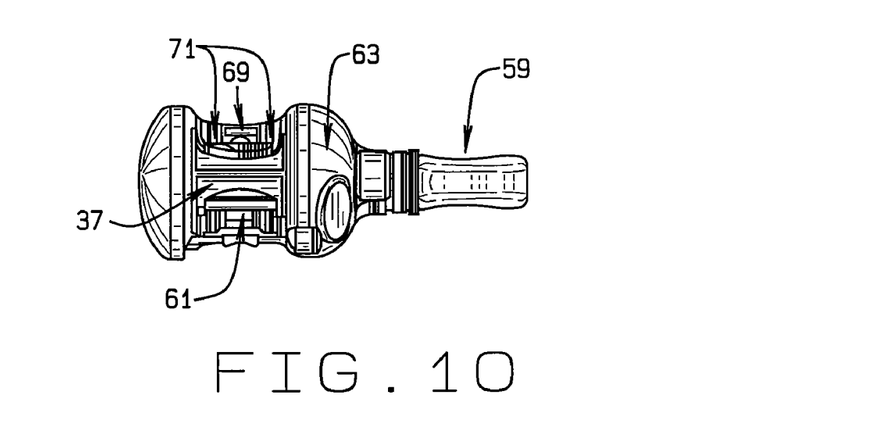
FIG. 10 is a rear view of an embodiment of the present invention, this particular embodiment comprising a permanent drag lock system.
Figure 11:
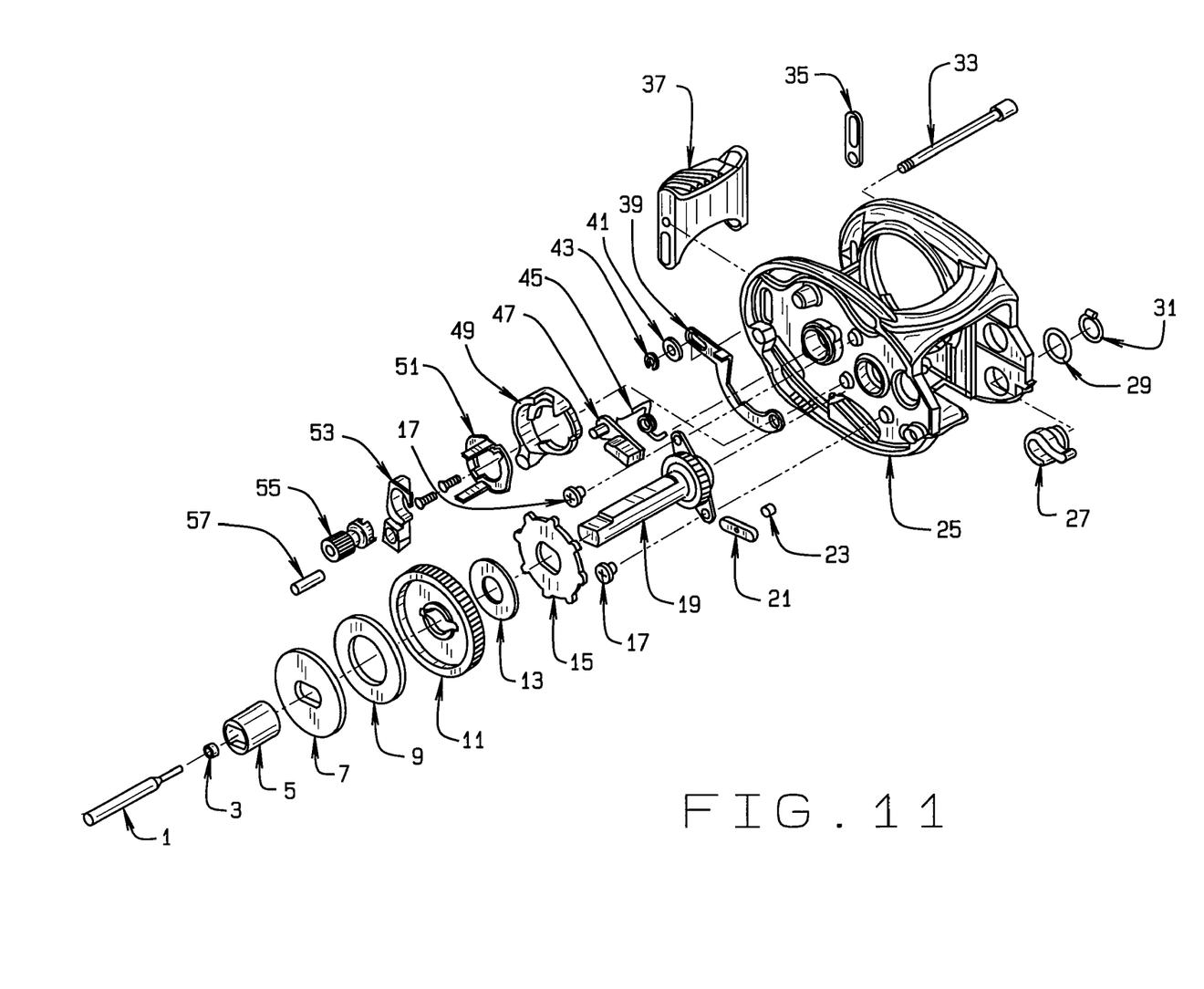
FIG. 11 is an exploded view of an embodiment of the adjustable drag lock system of the present invention.

Referring now to FIG. 11, the present invention includes an adjustable drag lock system. In this embodiment, the clutch mechanism of the present invention includes a yoke sleeve 57, a pinion 55, a yoke 53, a clutch spring mount 51, a clutch cam 49, a kick lever 47, a torsion spring 45, an e-clip retainer 43, a thumb bar 37, a thumb bar washer 41, a clutch plate 39, a thumb bar spacer 35 and a clutch bar pin 33.

In this embodiment, the adjustable drag lock system of the present invention includes an engagement pin 1, a top spring 3, a drag sleeve 5, a drag plate 7, a drag washer 9, a gear 11, a spacer washer 13, a kick ratchet 15, a crankshaft assembly 19, screws 17, a key 21 and a bottom spring 23. All of these components are shown exploded in the order as they would be assembled in and on the frame 25. In this embodiment, the gear 11 has been cut to accept the key 21. In this embodiment, the crankshaft assembly 19 has been cut to accept additional components listed above. Additionally, a quick release latch 27, quick release washer 29 and quick release retainer 31 are included in this embodiment.

Figure 12:
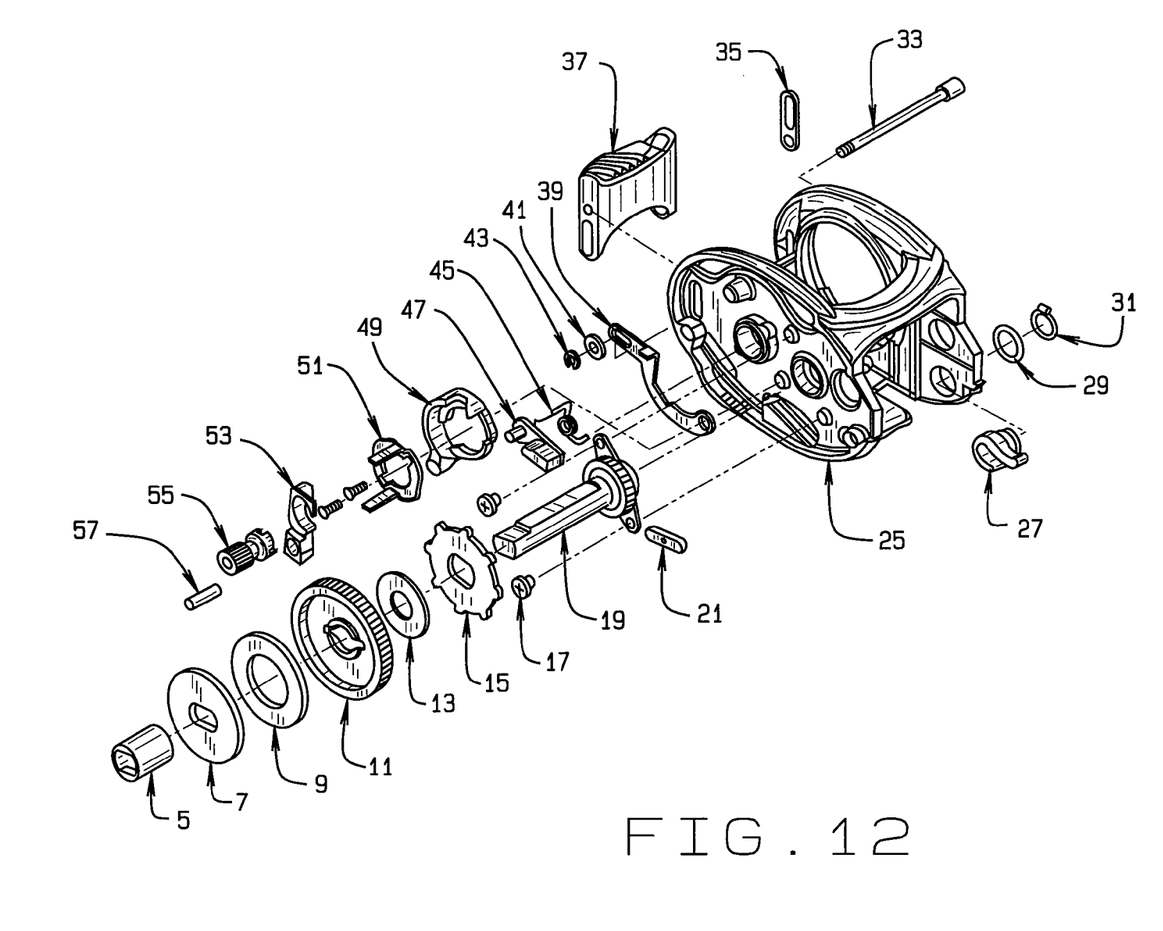
FIG. 12 is an exploded view of an embodiment of the permanent drag lock system of the present invention.

Referring now to FIG. 12, the present invention includes a permanent drag lock system. In this embodiment, the clutching mechanism of the present invention includes a yoke sleeve 57, a pinion 55, a yoke 53, a clutch spring mount 51, a clutch cam 49, a kick lever 47, a torsion spring 45, an e-clip retainer 43, a thumb bar 37, a thumb bar washer 41, a clutch plate 39, a thumb bar spacer 35 and a clutch bar pin 33.

In this embodiment, the permanent drag lock system of the present invention includes an a drag sleeve 5, a drag plate 7, a drag washer 9, a gear 11, a spacer washer 13, a kick ratchet 15, a crankshaft assembly 19, screws 17, and a key 21. All of these components are shown exploded in the order as they would be assembled in and on the frame 25. In this embodiment, the gear 11 has been cut to accept the key 21. In this embodiment, the crankshaft assembly 19 has been cut to accept additional components listed above. Additionally, a quick release latch 27, quick release washer 29 and quick release retainer 31 are included in this embodiment.

One particular benefit of this particular embodiment of the permanent drag lock system is that the manufacturer of the reel may omit certain internal elements found in FIG. 11 to produce the reel found in FIG. 12, saving production and development costs.

It should be understood that the aforementioned embodiments are for exemplary purposes only and are merely illustrative of the many possible specific embodiments that can represent applications of the principles of the invention.

Without departing from the spirit and scope of this invention, one of ordinary skill in the art can make various changes and modifications to the invention to adapt it to various usages and conditions, including those not specifically laid out herein. As such, those changes and modifications are properly, equitably, and intended to be, within the full range and scope of equivalents of the invention disclosed and described herein.

We claim:

1. A bait cast fishing reel comprising a frame, a spool, and a handle, wherein the frame comprises a brake housing, the spool is rotatably attached to and contained within the frame, the handle is rotatably attached to a crankshaft, the handle and the spool inversely rotate in parallel via a gear mechanism, and the brake housing is contained on the portion of the frame opposite the handle, wherein the frame further comprises a front cover, the front cover comprising a line hole, where the front cover does not include a level wind mechanism, and wherein the spool further comprises a recessed portion and two full portions, the recessed portion residing between the two full portions, and a line retainer element, the line retainer element residing on the recessed portion of the spool.

2. The bait cast fishing reel of claim 1, wherein the line retainer element is located substantially in the center of the recessed portion of the spool.

3. The bait cast fishing reel of claim 1, where the recessed portion of the spool is of substantially the same width as the diameter of the line hole, and wherein the recessed portion of the spool is in substantial alignment with the line hole.

4. The bait cast fishing reel of claim 1, where the line hole consists essentially of a ceramic or stainless steel.

5. The bait cast fishing reel of claim 4, where the line hole consists essentially of stainless steel and is coated in chromium nitride or titanium nitride.

6. The bait cast fishing reel of claim 1, where the wind ratio of the handle to the spool is between about 1:1 to about 7:1.

7. The bait cast fishing reel of claim 6, where the wind ratio of the handle to the spool is between about 5:1 to about 7:1.

8. The bait cast fishing reel of claim 7, where the wind ratio of the handle to the spool is about 6:1.

9. The bait cast fishing reel of claim 1, where the line retainer element is a mushroom-type peg.

10. The bait cast fishing reel of claim 1, further comprising a permanent drag lock system.

11. The bait cast fishing reel of claim 1, further comprising an adjustable drag lock system.

12. A bait cast fishing reel comprising a frame, a spool, and a handle, wherein the frame comprises a brake housing, the spool is rotatably attached to and contained within the frame, the handle is rotatably attached to a crankshaft, the handle and the spool inversely rotate in parallel via a gear mechanism, and the brake housing is contained on the portion of the frame opposite the handle, wherein the frame further comprises a front cover, the front cover comprising a line hole, where the front cover does not include a level wind mechanism, and wherein the spool further comprises a recessed portion and two full portions, the recessed portion residing between the two full portions, and a line retainer element, the line retainer element residing on the recessed portion of the spool, and wherein the bait cast fishing reel further comprises an adjustable drag lock system.

13. A bait cast fishing reel comprising a frame, a spool, and a handle, wherein the frame comprises a brake housing, the spool is rotatably attached to and contained within the frame, the handle is rotatably attached to a crankshaft, the handle and the spool inversely rotate in parallel via a gear mechanism, and the brake housing is contained on the portion of the frame opposite the handle, wherein the frame further comprises a front cover, the front cover comprising a line hole, where the front cover does not include a level wind mechanism, and wherein the spool further comprises a recessed portion and two full portions, the recessed portion residing between the two full portions, and a line retainer element, the line retainer element residing on the recessed portion of the spool, and wherein the bait cast fishing reel further comprises a permanent drag lock system.

14. A bait cast fishing reel comprising a frame, a spool, and a handle, wherein the frame comprises a brake housing, the spool is rotatably attached to and contained within the frame, the handle is rotatably attached to a crankshaft, the handle and spool inversely rotate in parallel via a gear mechanism, and the brake housing is contained on the portion of the frame opposite the handle, wherein the frame further comprises a front cover, the front cover comprising a line hole, where the front cover does not include a level wind mechanism, and wherein the spool further comprises a recessed portion and two full portions, the recessed portion residing between the two full portions, and a line retainer element, the line retainer element residing on the recessed portion of the spool, and wherein the line retainer element is located substantially in the center of the recessed portion of the spool, and wherein the recessed portion of the spool is of substantially the same width as the diameter of the line hole, and wherein the recessed portion of the spool is in substantial alignment with the line hole, and wherein the line hole is stainless steel coated in chromium nitride, and wherein the wind ratio of the handle to the spool is about 6:1, and wherein the line retainer element is a mushroom-type peg.

15. The bait case fishing reel of claim 14 further comprising an adjustable drag lock system.

16. The bait cast fishing reel of claim 14 further comprising a permanent drag lock system.

\* \* \* \* \*